United States Patent
Chen et al.

(10) Patent No.: US 8,581,878 B2
(45) Date of Patent: Nov. 12, 2013

(54) METHOD FOR MITIGATING POOLING MURA ON LIQUID CRYSTAL DISPLAY APPARATUS AND LIQUID CRYSTAL DISPLAY APPARATUS

(75) Inventors: Zeng-De Chen, Hsin-Chu (TW); Hong-Ji Huang, Hsin-Chu (TW); Seok-Lyul Lee, Hsin-Chu (TW); Yuet-Ping Lee, Hsin-Chu (TW); Yu-Cheng Tsai, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 887 days.

(21) Appl. No.: 12/609,185

(22) Filed: Oct. 30, 2009

(65) Prior Publication Data
US 2010/0220068 A1     Sep. 2, 2010

(30) Foreign Application Priority Data
Feb. 27, 2009  (TW) ................ 98106581 A

(51) Int. Cl.
  *G06F 3/045*  (2006.01)
  *G06F 3/041*  (2006.01)
(52) U.S. Cl.
  USPC .......................................... 345/174; 345/173
(58) Field of Classification Search
  USPC .......................................................... 345/173
  See application file for complete search history.

(56) References Cited

U.S. PATENT DOCUMENTS

| | | | |
|---|---|---|---|
| 4,804,953 A * | 2/1989 | Castleberry ..................... | 345/93 |
| 6,501,529 B1 * | 12/2002 | Kurihara et al. ............. | 349/160 |
| 7,298,353 B2 * | 11/2007 | Li ..................................... | 345/87 |
| 2003/0222857 A1 * | 12/2003 | Abileah ........................ | 345/173 |
| 2005/0099377 A1 * | 5/2005 | Kim ................................. | 345/98 |
| 2006/0109391 A1 * | 5/2006 | Huitema et al. ................ | 349/19 |
| 2008/0117182 A1 * | 5/2008 | Um et al. ....................... | 345/173 |
| 2008/0158144 A1 * | 7/2008 | Schobben et al. ............ | 345/156 |
| 2008/0186288 A1 * | 8/2008 | Chang ........................... | 345/174 |
| 2010/0315362 A1 * | 12/2010 | Cheng et al. .................. | 345/173 |
| 2011/0001723 A1 * | 1/2011 | Fan ................................ | 345/174 |
| 2011/0012844 A1 * | 1/2011 | Chang et al. .................. | 345/173 |
| 2011/0075059 A1 * | 3/2011 | Shih et al. ....................... | 349/12 |

FOREIGN PATENT DOCUMENTS

CN  101221735 A  7/2008

* cited by examiner

*Primary Examiner* — Alexander S Beck
*Assistant Examiner* — Mihir Rayan
(74) *Attorney, Agent, or Firm* — WPAT, PC; Justin King

(57) ABSTRACT

A method for mitigating pooling mura on LCD apparatus and a LCD apparatus are provided. The method is adapted for a LCD apparatus having a plurality of pixels. The LCD apparatus is for displaying frames according to a received original display data, and each of at least a part of the pixels comprises two pixel electrodes to drive a plurality of liquid crystal molecules between the two pixel electrodes. The method comprises changing a corresponding portion of the original display data so as to rotate at least a part of the liquid crystal molecules between the two pixel electrodes of the pressed pixel toward a natural angle; and maintaining another corresponding portion of the original display data. The natural angle is a finally-presented tilt angle of the liquid crystal molecules between the corresponding two pixel electrodes having substantially no potential difference therebetween.

2 Claims, 9 Drawing Sheets

METHOD FOR MITIGATING POOLING MURA ON LIQUID CRYSTAL DISPLAY APPARATUS AND LIQUID CRYSTAL DISPLAY APPARATUS

CROSS-REFERENCE TO RELATED APPLICATIONS

This application is based upon and claims the benefit of priority from the prior Taiwanese Patent Application No. 098106581, filed Feb. 27, 2009, the entire contents of which are incorporated herein by reference.

BACKGROUND

1. Field of the Invention

The present invention relates to the field of the display technology, and more particularly to a method for mitigating pooling mura on liquid crystal display (LCD) apparatus and a LCD apparatus.

2. Description of the Related Art

Since LCD apparatus has many advantages, such as high frame-quality, little size, light weight, and wide application-range, etc., the LCD apparatus is widely used into various consumable electrical products, such as mobile phone, notebook computer, desktop display apparatus and television, etc. Thus the LCD apparatus has gradually substituted for conventional cathode ray tube (CRT) display apparatus to be a mainstream of display apparatuses.

In a conventional technology employing a normal-white LCD apparatus to display black frames, if an external force is applied to a panel of the normal-white LCD apparatus and drags, the external force will change alignment of liquid crystal molecules at pressed locations to form a white trailing smear after dragging. The white trailing smear disappears after a period of time because of returning alignment of the liquid crystal molecules. If the applied external force is larger, an area of the white trailing smear is larger. The above phenomenon is called pooling mura. Similarly, the pooling mura (displaying a black trailing smear) may generally occur in a normal-black LCD apparatus when the normal-black LCD apparatus displays white frames.

Therefore, if users press the panel of the LCD apparatus, such as performing a touch operation, the frames cannot be displayed normally because of keeping the white/black trailing smear for a long time. Alternatively, if a distance of the trailing smear is too long, the users will easily mistake that the panel of the LCD apparatus is damaged. Thus the LCD apparatus is greatly inconvenient in use.

BRIEF SUMMARY

The present invention relates to a method for mitigating pooling mura on liquid crystal display (LCD) apparatus.

The present invention relates to a LCD apparatus, which can mitigate pooling mura thereon.

A method for mitigating pooling mura on LCD apparatus in accordance with an exemplary embodiment of the present invention is provided. The method is adapted for a LCD apparatus having a plurality of pixels. The LCD apparatus displays frames according to a received original display data, and each of at least a part of the pixels comprises two pixel electrodes to drive a plurality of liquid crystal molecules sandwiched between the two pixel electrodes. The method comprises steps of: changing a corresponding portion of the original display data which is initially for driving a pressed pixel at a pressed location, so as to rotate at least a part of the liquid crystal molecules sandwiched between the two pixel electrodes of the pressed pixel toward a natural angle; and maintaining another corresponding portion of the original display data for driving at least a part of the pixels except for the pressed pixel. The natural angle is a finally-presented tilt angle of the liquid crystal molecules between the corresponding two pixel electrodes having substantially no potential difference therebetween.

In an exemplary embodiment of the present invention, the method further comprises steps of: arranging a touch panel on the LCD apparatus; and judging which one of the pixels is the pressed pixel by employing the touch panel to detect a location of a touch point thereon. The touch panel is a surface mount touch panel or an in-cell touch panel.

In an exemplary embodiment of the present invention, the step of changing the corresponding portion of the original display data which is initially for driving the pressed pixel at the pressed location so as to rotate at least a part of the corresponding liquid crystal molecules sandwiched between the two pixel electrodes of the pressed pixel toward the natural angle, comprises steps of: changing the corresponding portion of the original display data which is predetermined to be supplied to the two pixel electrodes of the pressed pixel to be an adjusted data; and supplying the adjusted data to the two pixel electrodes of the pressed pixel. The absolute value of the voltage of the corresponding portion of the original display data is larger than the absolute value of the voltage of the adjusted data. Furthermore, the voltage of the adjusted data is approximately 0.

A method for mitigating pooling mura on LCD apparatus in accordance with another exemplary embodiment of the present invention is provided. The method is adapted for a LCD apparatus having a plurality of pixels, and any one of the pixels has two pixel electrodes. The method comprises steps of: electrically coupling the two pixel electrodes of a pressed pixel at a pressed location for making potentials of the two pixel electrodes to be a predetermined potential. Furthermore, the method further comprises steps of: arranging a touch panel on the LCD apparatus; and judging which one of the pixels is the pressed pixel by employing the touch panel to detect a location of a touch point thereon. The touch panel is a surface mount touch panel or an in-cell touch panel.

A method for mitigating pooling mura on LCD apparatus in accordance with other exemplary embodiment of the present invention is provided. The method is adapted for a LCD apparatus having a plurality of pixels. The LCD apparatus receives an original display data, and each of at least a part of the pixels comprises two pixel electrodes. The method comprises steps of: displaying a first frame according to a corresponding portion of the original display data; and displaying a second frame after displaying the first frame. A display data for driving the second frame is altered according to whether the LCD apparatus is pressed.

In an exemplary embodiment of the present invention, the absolute value of the voltage between the corresponding two pixel electrodes of each of the pixels during displaying the second frame is less than the absolute value of the voltage between the corresponding two pixel electrodes of each of the pixels during displaying the first frame.

In an exemplary embodiment of the present invention, the first frame is a white frame and the second frame is a black frame. Alternatively, the first frame is a black frame and the second frame is a white frame.

A method for mitigating pooling mura on LCD apparatus in accordance with other exemplary embodiment of the present invention is provided. The method is adapted for a LCD apparatus having a plurality of pixels, and each of at least a part of the pixels comprises two pixel electrodes for driving a plurality of liquid crystal molecules sandwiched between the two pixel electrodes. The method comprises steps of: detecting which one of the pixels is a pressed pixel at a pressed location; and supplying a compensation signal to a signal line adjacent to the pressed pixel for rotating the liquid crystal molecules in the pressed pixel adjacent to the signal line toward a natural angle. The natural angle is a finally-presented tilt angle of the liquid crystal molecules between corresponding two pixel electrodes having substantially no potential difference therebetween.

In an exemplary embodiment of the present invention, the signal line is an useless redundant line or a readout line for detecting the pressed pixel.

A method for mitigating pooling mura on LCD apparatus in accordance with other exemplary embodiment of the present invention is provided. The method is adapted for a LCD apparatus having a plurality of pixels. The method comprises steps of: detecting whether performing a pressing operation to the LCD apparatus; and inserting an adjusted frame according to an inserting display data between two predetermined sequential frames presented by the LCD apparatus according to a received original display data when the pressing operation is performed. The inserting display data is different from the original display data.

In an exemplary embodiment of the present invention, the method further comprises: identifying which one of the pixels is influenced by the pressing operation; and changing a portion of the original display data for driving the influenced pixel to obtain the inserting display data.

In an exemplary embodiment of the present invention, the two predetermined sequential frames presented by the LCD apparatus according to the received original display data are white frames, and the adjusted frame is a black frame. Alternatively, the two predetermined sequential frames presented by the LCD apparatus according to the received original display data are black frames, and the adjusted frame is a white frame.

A LCD apparatus in accordance with other exemplary embodiment of the present invention, comprises a first substrate, a plurality of display electrodes, a second substrate, at least one sensing photo spacer and a conducting layer. The display electrodes are formed on the first substrate for receiving a display data. The sensing photo spacer protrudes on a first surface of the second substrate. The conducting layer covers on at least a part of the first surface and the sensing photo spacer. When combining the second substrate with the first substrate, the sensing photo spacer is opposite to one of the display electrodes arranged at a corresponding location, and the conducting layer covering on the sensing photo spacer is not electrically coupled to the display electrodes. When pressing the second substrate, the conducting layer covering the sensing photo spacer adjacent to the pressed location contacts with the corresponding display electrode. Furthermore, the conducting layer is a common electrode of the LCD apparatus.

The exemplary embodiments of the present invention employ software or hardware methods to change the display data for driving the pressed pixel at the pressed location. Thus the pressed pixel is converted into another display state in the pressed period, or the periphery of the pressed pixel is supplied an addition driving force. Therefore the liquid crystal molecules can obtain an additional rotation power for accelerating to return the alignment before being pressed. Therefore, the above methods can solve the problems of the conventional arts to mitigate the pooling mura on the LCD apparatus.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present method for mitigating pooling mura on liquid crystal display (LCD) apparatus, in detail. The following description is given by way of example, and not limitation.

Figure 1:
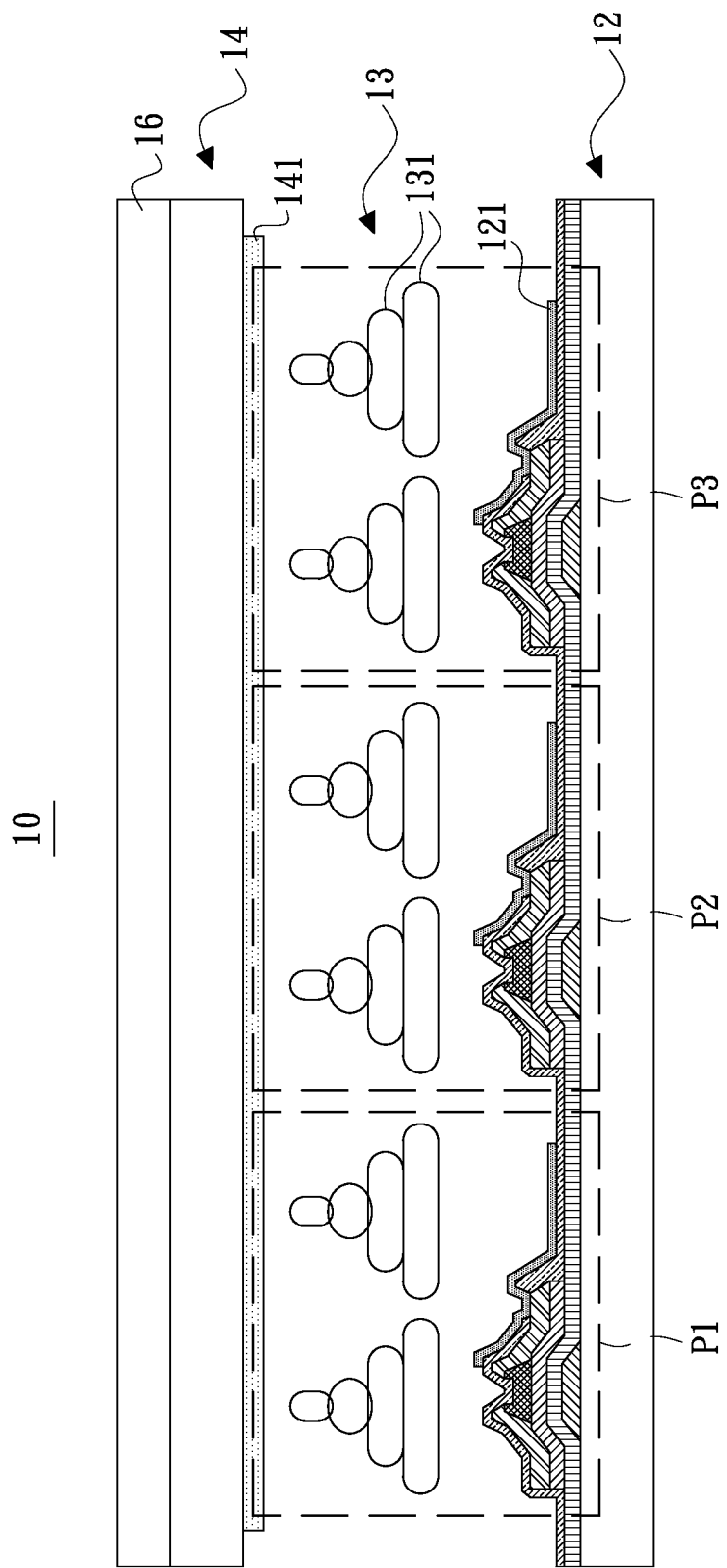
FIG. 1 is a partial cross-sectional view of a LCD apparatus in accordance with a first exemplary embodiment of the present invention.

Referring to FIGS. 1 to 4, a method for mitigating pooling mura on LCD apparatus in accordance with a first exemplary embodiment of the present invention is provided. The method is adapted for a LCD apparatus 10 having a plurality of pixels P1, P2, P3. As shown in FIG. 1, the LCD apparatus 10 includes a thin-film transistor array (TFT array) substrate 12, a liquid crystal layer 13, a second substrate 14 and a touch panel 16. Each of the pixels P1, P2, P3 includes a thin-film transistor (not marked in FIG. 1) and a display electrode 121 formed on the TFT array substrate 12. A conducting layer 141 is formed on the second substrate 14 to be used as a common electrode of the LCD apparatus 10. Herein, the display electrode 121 is served as a pixel electrode of each of the pixels P1, P2, P3, and the conducting layer 141 is served as another pixel electrode of each of the pixels P1, P2, P3. The liquid crystal layer 13 is sandwiched between the TFT array substrate 12 and the second substrate 14, and includes a plurality of liquid crystal molecules 131. A part of the liquid crystal molecules 131 is sandwiched between the two pixel electrodes of each of the pixels P1, P2, P3, and is driven by the two pixel electrodes of each of the pixels P1, P2, P3 to control a tilt angle thereof. The touch panel 16 is attached on an exterior of the second substrate 14. It should be noted that, the touch panel 16 is not limited to be a surface mount touch panel as shown in FIG. 1, and it may be an in-cell touch panel.

Figure 2:
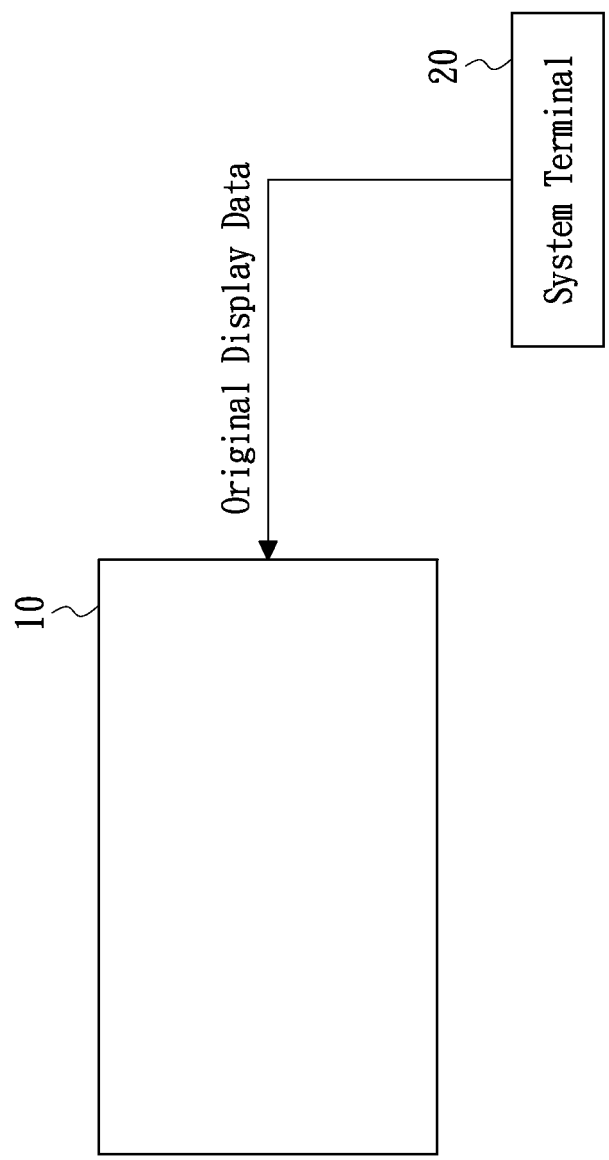
FIG. 2 shows the LCD apparatus of the first exemplary embodiment of the present invention receiving an original display data from a system terminal.

Referring to FIGS. 1 and 2 together, the LCD apparatus obtains an original display data from a system terminal 20.

Then the original display data is supplied to the two pixel electrodes of each of the pixels P1, P2, P3 to drive the liquid crystal molecules 131 sandwiched between the two pixel electrodes for displaying frames.

Figure 3:
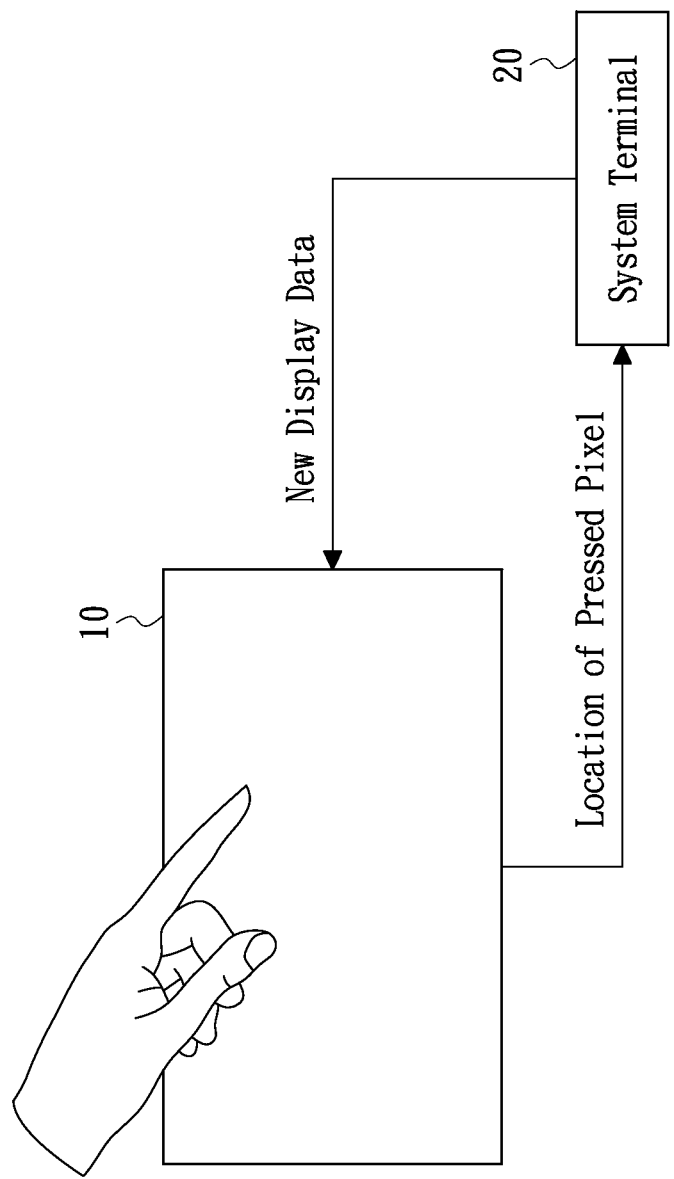
FIG. 3 shows the LCD apparatus of the first exemplary embodiment of the present invention receiving a new display data according to a location of a pressed pixel from the system terminal.
Figure 4:
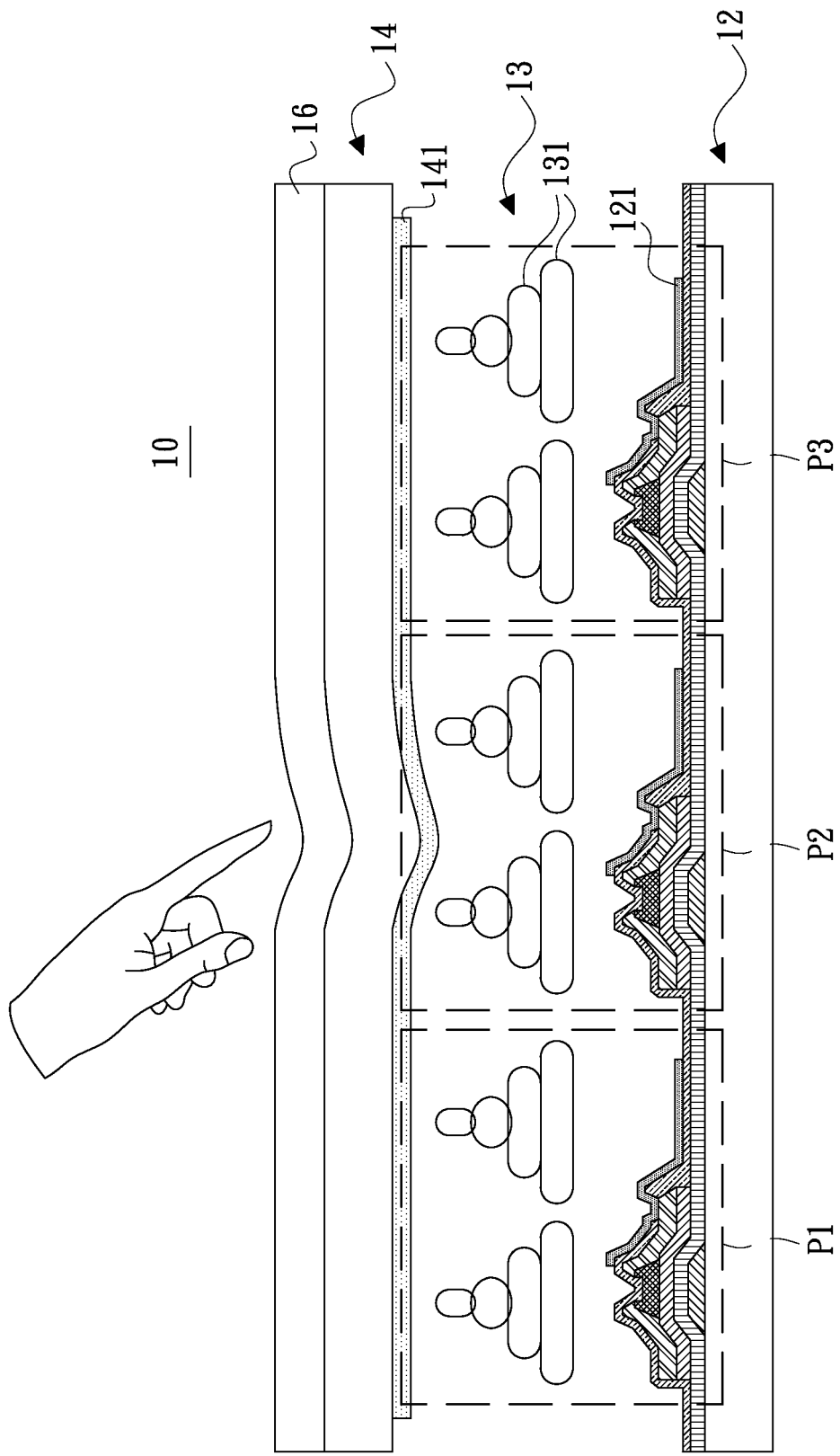
FIG. 4 is a partial cross-sectional view of the LCD apparatus as shown in FIG. 1 when it is pressed.

Referring to FIGS. 3 and 4 together, when an object such as a finger (not marked in FIGS. 3 and 4) presses the LCD apparatus 10, the touch panel 16 of the LCD 10 apparatus is employed to detect a location of a touch point, to judge which one of the pixels P1, P2, P3 is a pressed pixel at a pressed location, and output the location of the pressed pixel P2 to the system terminal 20. According to the received location of the pressed pixel P2 outputted from the LCD apparatus 10, the system terminal 20 changes a corresponding portion of the original display data which is initially configured for driving the pressed pixel P2 at the pressed location to obtain an adjusted data, and maintains another corresponding portion of the original display data which is configured for driving the other pixels P1, P3 of the pixels P1, P2, P3 except for the pressed pixel P2, so as to finally output a new display data to the LCD apparatus 10. The adjusted data of the new display data subsequently inputted to the LCD apparatus 10 is supplied to the two pixel electrodes of the pressed pixel P2, such that at least a part of the liquid crystal molecules 131 corresponding to the pressed pixel P2 are rotated toward a natural angle. The time for supplying the adjusted data to the two pixel electrodes of the pressed pixel P2 may be several to several tens frames of a picture period after stopping pressing. The natural angle is a tilt angle presented finally by the liquid crystal molecules 131 between corresponding two pixel electrodes when the corresponding two pixel electrodes have no potential difference therebetween.

In the first exemplary embodiment of the present invention, the absolute value of the voltage of the corresponding portion of the original display data which is initially used for driving the pressed pixel P2 at the pressed location (corresponding to the potential difference between the two pixel electrodes of the pressed pixel P2) is larger than that the absolute value of the voltage of the adjusted data. The voltage of the adjusted data is approximately 0. Therefore, by supplying the adjusted data, the normal-white LCD apparatus can display a white frame at the location of the pressed pixel P2 when it displays black frames and is pressed. Correspondingly, the normal-black LCD apparatus can display a black frame at the location of the pressed pixel P2 when it displays white frames and is pressed. Thus, the above pooling mura can be mitigated.

In addition, when the touch panel 16 does not detect any touch point, the system terminal 20 is set to keep outputting the original display data. Thus the LCD apparatus 10 drives the pixels P1, P2 and P3 according to the original display data.

Figure 5:
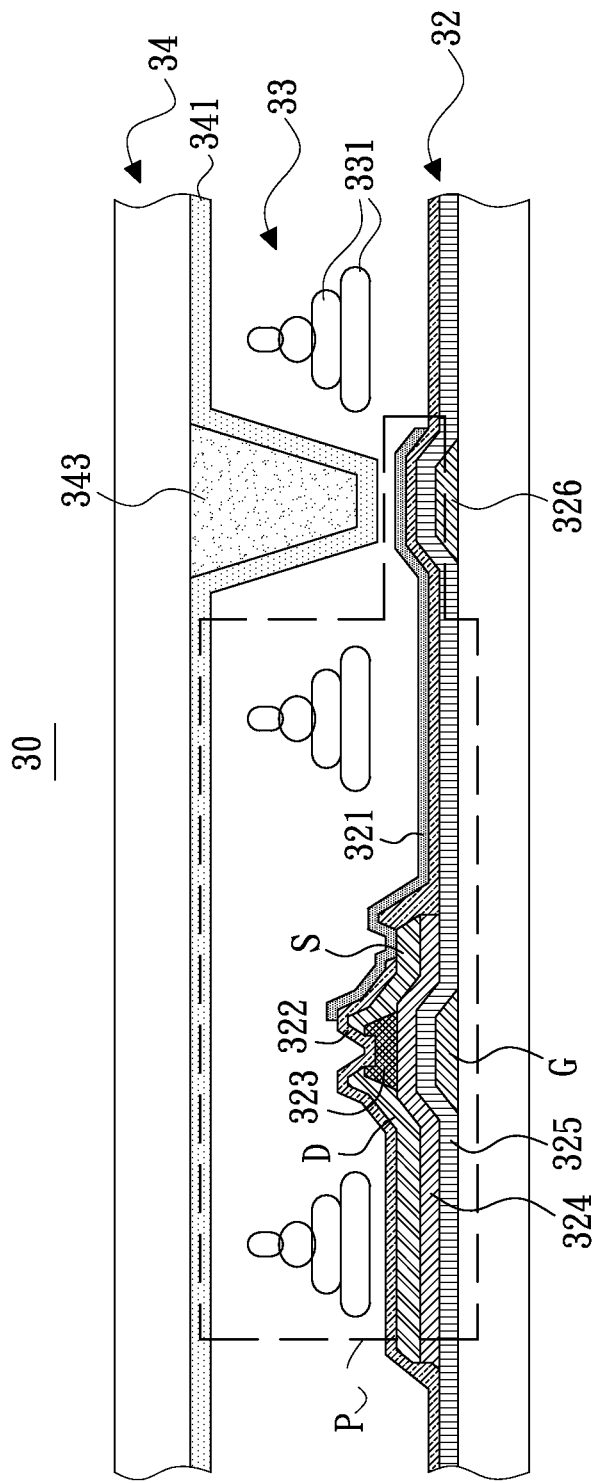
FIG. 5 is a partial cross-sectional view of a LCD apparatus in accordance with a second exemplary embodiment of the present invention.
Figure 6:
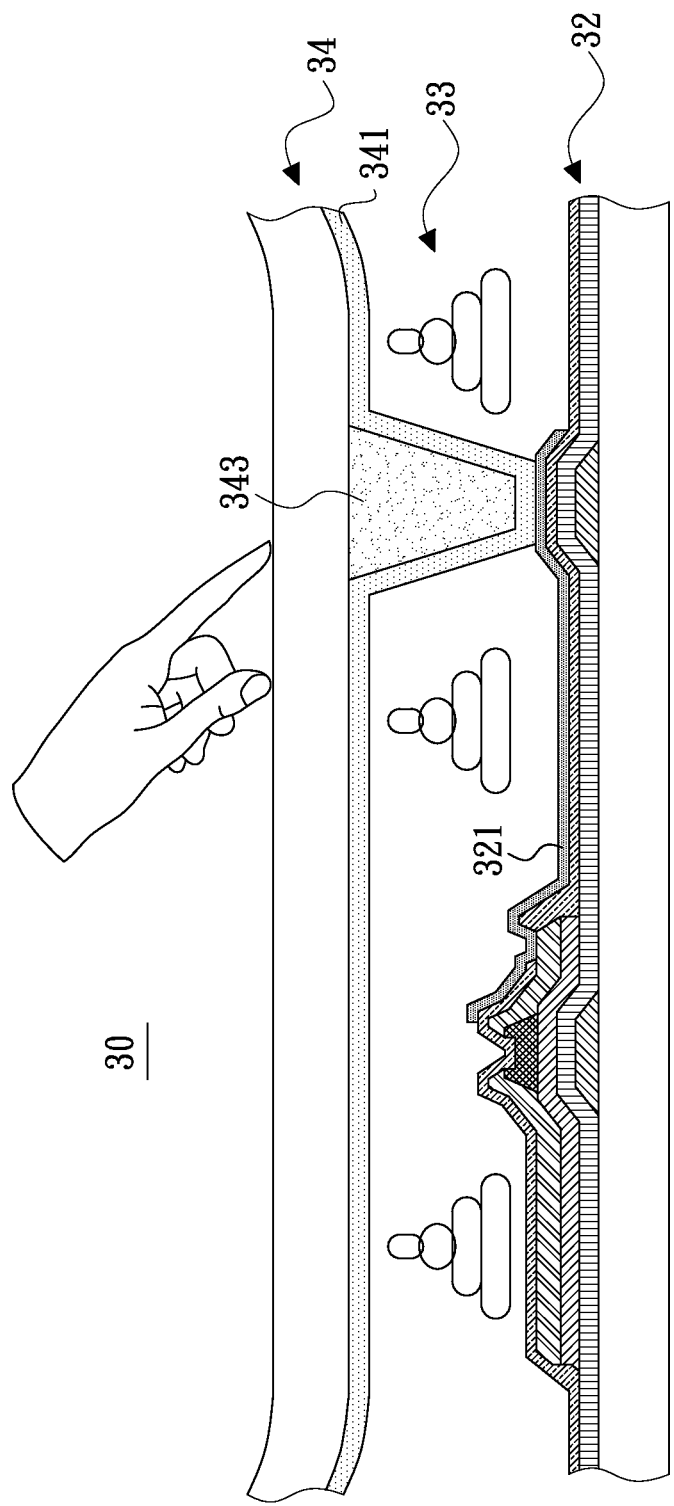
FIG. 6 is a partial cross-sectional view of the LCD apparatus as shown in FIG. 5 when it is pressed.

Referring to FIGS. 5 and 6, a method for mitigating pooling mura on LCD apparatus in accordance with a second exemplary embodiment of the present invention is provided. The method is adapted for a LCD apparatus 30 having a plurality of pixels P (FIGS. 5 and 6 only illustrate a single pixel for an example). As shown in FIG. 5, the LCD apparatus 30 includes a TFT array substrate 32, a liquid crystal layer 33 and a second substrate 34. The single pixel P as shown in FIG. 5 includes a thin film transistor (not marked in FIG. 5) and a display electrode 321 formed on the TFT array substrate 32. The thin film transistor includes a gate electrode G, a gate insulating layer 325, an amorphous-silicon (a-Si) layer 324, a nitride-silicon layer 323, a drain electrode D, a source electrode S and a passivation layer 322. The display electrode 321 is formed on the passivation layer 322 and is electrically coupled to the source electrode S of the thin film transistor. A shield metal 326 covered by the gate insulating layer 325 and the passivation layer 322 is further formed on the TFT array substrate 32.

A conducting layer 341 is formed on the second substrate 34 and a sensing photo spacer 343 is protruded on an inner surface of the second substrate 34. The conducting layer 341 covers at least a part of the inner surface of the second substrate 34 and the sensing photo spacer 343 to be used as a common electrode of the LCD apparatus 30. Herein, the display electrode 321 is used as a pixel electrode of the pixel P to receive the display data, and the conducting layer 341 is used as another pixel electrode of the pixel P, i.e., the conducting layer 341 is used as common electrode of the pixel P. From FIG. 5 it can be seen that when combining the second substrate 34 and the TFT array substrate 32, the liquid crystal layer 33 is sandwiched between the TFT array substrate 32 and the second substrate 34, the sensing photo spacer 343 is opposite to the display electrode 321 of the pixel P at a corresponding location, and the shield metal 326 is arranged below the sensing photo spacer 343. Furthermore, the conducting layer 341 covering on the sensing photo spacer 343 is not electrically coupled to the display electrode 321. The liquid crystal layer 33 includes a plurality of liquid crystal molecules 331, a part of the liquid crystal molecules 331 is sandwiched between the two pixel electrodes of each pixel P and driven by the two pixel electrodes of each pixel P to control a tilt angle thereof.

Referring to FIG. 6, when an object such as a finger presses an outer surface of the second substrate 34 of the LCD apparatus 30, the conducting layer 341 covering on the sensing photo spacer 343 adjacent to the pressed location contacts with the corresponding display electrode 321 of the pixel P such that the conducting layer 341 is electrically coupled to the corresponding display electrode 321. Thus the two pixel electrodes of the pixel P adjacent to the pressed location are supplied a predetermined potential at the same time, such as the common voltage Vcom of the LCD apparatus 30.

In the second exemplary embodiment of the present invention, at least a part of the liquid crystal molecules sandwiched between the two pixel electrodes is rotated toward the above natural angle by supplying the predetermined potential to the two pixel electrodes of the pixel P adjacent to the pressed location at the same time, to mitigate the pooling mura.

Figure 7:
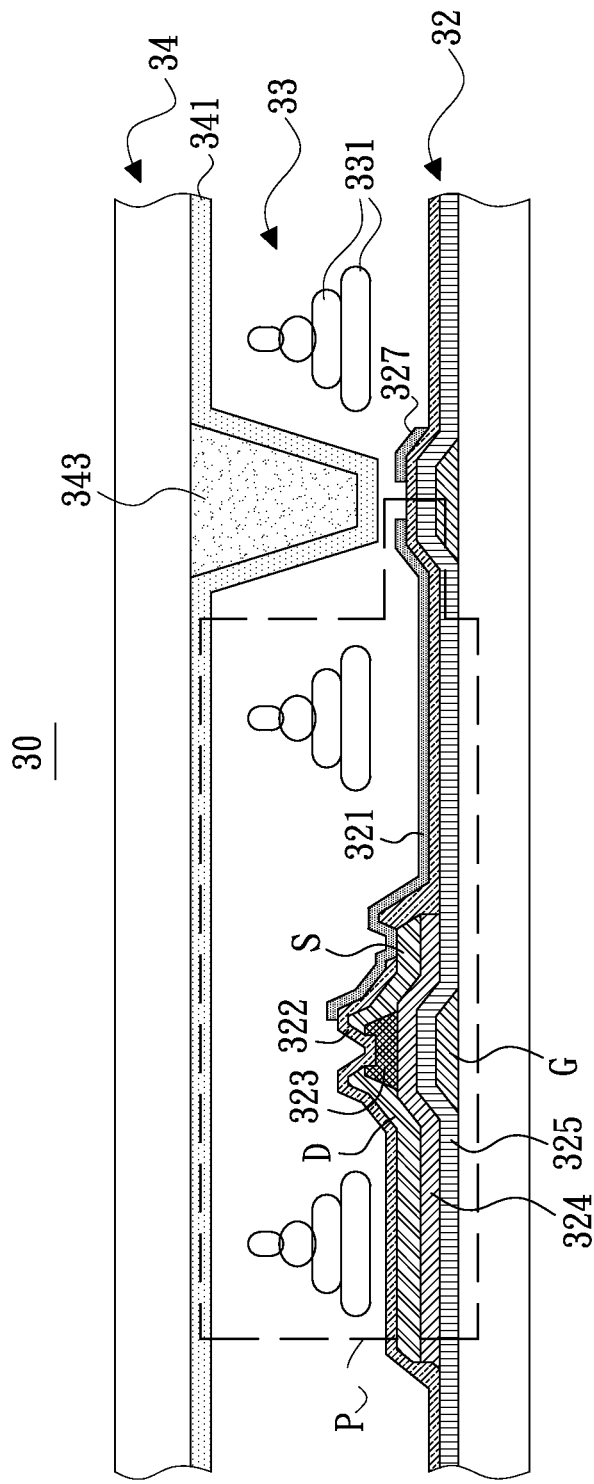
FIG. 7 is a partial cross-sectional view of another LCD apparatus of the second exemplary embodiment of the present invention.

It can be understood that, the second exemplary embodiment of the present invention, which provides the method of supplying the predetermined potential to the two pixel electrodes of the pixel P adjacent to the pressed location at the same time, is not limited to contact the conducting layer 341 with the display electrode 321 described in the above, and the method may be performed by other ways. For example, similarly with the LCD apparatus 10 as shown in FIG. 1, a touch panel (a surface mount touch panel or an in-cell touch panel) may be set on the LCD apparatus 30. It can judge which one of the plurality of pixels of the LCD apparatus 30 is the pressed pixel P by employing the touch panel to detect the location of the touch point. Then a switch element electrically coupled to the conducting layer 341 and the display electrode 321 of the pixel P adjacent to the pressed location is turned on, such that the two pixel electrodes of the pixel P adjacent to the pressed location are supplied the predetermined potential at the same time. Furthermore, as shown in FIG. 7, a sensing pad 327 may be formed on the TFT array substrate 32 to be an in-cell touch panel in the LCD apparatus 30. The sensing pad 327 is arranged at a location, where both of the sensing pad 327 and the display electrode 321 are contacted with the conducting layer 341 covering on the sensing photo spacer 343 when the sensing photo spacer 343 is pressed.

Figure 8:
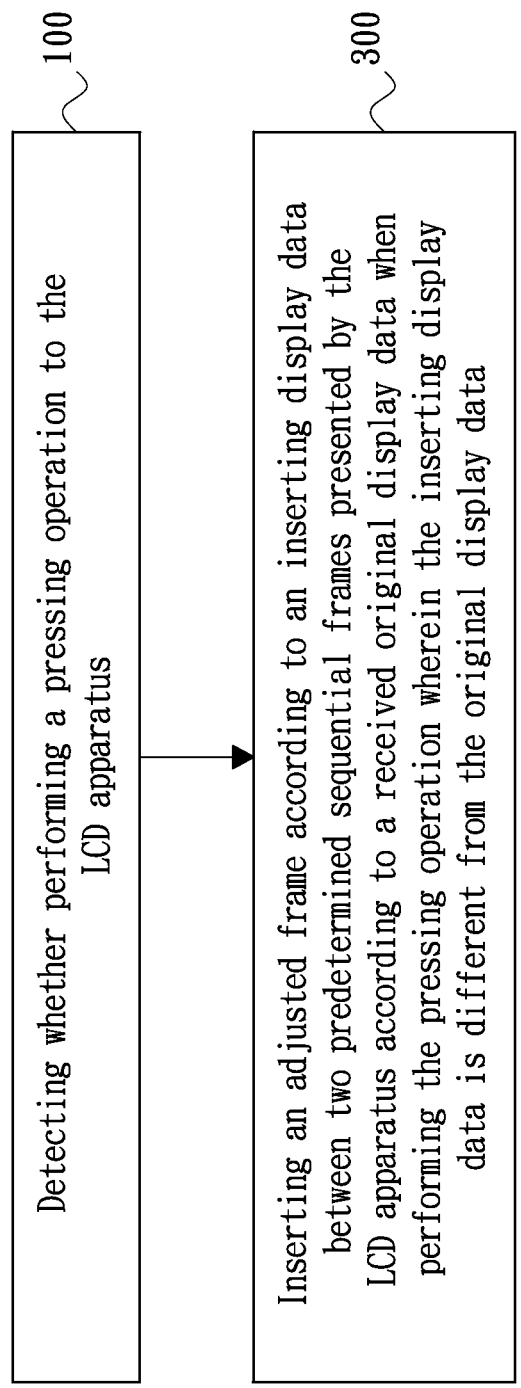
FIG. 8 is a flow chart of a method for mitigating pooling mura on LCD apparatus in accordance with a third exemplary embodiment of the present invention.

Refer to FIG. 8, which illustrates a flow chart of a method for mitigating pooling mura on LCD apparatus in accordance with a third exemplary embodiment of the present invention.

The method of the third exemplary embodiment of the present invention is adapted for a LCD apparatus (as shown in FIG. 1) having a plurality of pixels. The LCD apparatus receives an original display data, and each of the pixels includes two pixel electrodes. The method of the present exemplary embodiment includes steps of: detecting whether performing a pressing operation to the LCD apparatus (step 100); inserting an adjusted frame according to an inserting display data between two predetermined sequential frames presented by the LCD apparatus according to a received original display data when performing the pressing operation. The inserting display data is different from the original display data (step 300). The absolute value of the voltage (that is the potential difference) between the corresponding two pixel electrodes of each of the pixels of the LCD apparatus for displaying the two predetermined sequential frames is less than the absolute value of the voltage between the corresponding two pixel electrodes of each of the pixels for displaying the adjusted frame. Furthermore, when the two predetermined sequential frames presented by the LCD apparatus are white frames, the second frame is set to be a black frame. Similarly, when the two predetermined sequential frames are black frames, the second frame is set to be a white frame.

Furthermore, the inserting display data can be obtained by identifying which one of the pixel is influenced by the pressing operation and changing a part of the original display data which is for driving the influenced pixel. In other words, whether inserting the adjusted frame is determined by whether pressing the LCD apparatus.

Figure 9:
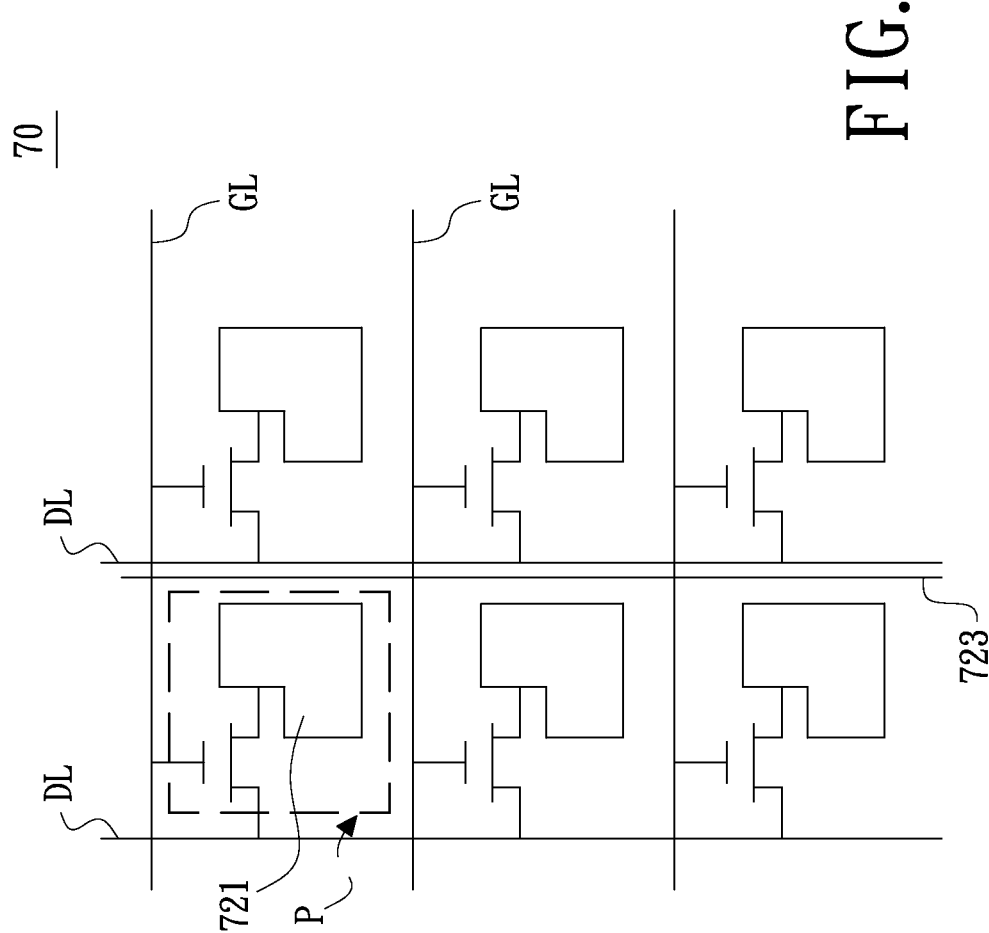
FIG. 9 is a partial schematic view of a LCD apparatus in accordance with a fourth exemplary embodiment of the present invention.

Referring to FIG. 9, a method for mitigating pooling mura on LCD apparatus in accordance with a fourth exemplary embodiment of the present invention is provided. The method is adapted for a LCD apparatus 70 having a plurality of pixels P. The LCD apparatus 70 includes a surface mount touch panel or an in-cell touch panel (not shown in FIG. 9). Each of the pixels includes two pixel electrodes for driving a plurality of liquid crystal molecules therebetween. One of the two pixel electrodes of each of the pixels is a display electrode 721, and another thereof is a common electrode of the LCD apparatus 70 (such as the conducting layer 141 as shown in FIG. 1). The two pixel electrodes are configured for driving the plurality of liquid crystal molecules sandwiched therebetween to control a tilt angle of the liquid crystal molecules.

The pixels P are arranged at intersectional locations of gate lines GL and data lines DL, and are electrically connect to the corresponding gate lines GL and the corresponding data lines DL respectively. Furthermore, the LCD apparatus 70 has signal lines 723 adjacent to the data lines DL respectively. The signal lines 723 may be parallel to the data lines DL. It is obvious for that skilled in the art that, the data lines DL are arranged in black matrix areas (or called opaque areas) of the pixels P for a color LCD apparatus. Similarly with the data lines DL, the signal lines 723 also may be arranged in the black matrix areas of the pixels P. In this exemplary embodiment, the signal lines 723 may be useless redundant lines or readout lines configured for detecting the pressed pixel.

In addition, the method for mitigating pooling mura on LCD in accordance with the fourth exemplary embodiment of the present invention includes steps of: employing the touch panel of the LCD apparatus 70 to detect which one of the pixels P is the pressed pixel P at the pressed location, and supplying a compensation signal to the signal line 723 adjacent to the pressed pixel P to rotate the liquid crystal molecules in the pressed pixel P and adjacent to the signal line 723 toward the above natural angle. Herein, the supplied compensation signal can make the periphery of the pressed pixel P obtain an additional return power. Thus, the liquid crystal molecules at the pressed location can be accelerated to return the alignment before being pressed for mitigating the pooling mura on the LCD apparatus.

In summary, the above exemplary embodiments of the present invention employ software or hardware methods to change the display data for driving the pressed pixel at the pressed location. Thus the pressed pixel is converted into another display state in the pressed period, and the liquid crystal molecules can obtain an additional rotation power for accelerating to return the alignment before being pressed. Therefore, the above methods can solve the problems of the conventional arts to mitigate the pooling mura on the LCD apparatus.

In addition, one skilled in the art can appropriately alter the methods for mitigating the pooling mura on the LCD apparatus and the LCD apparatuses of the above exemplary embodiments of the present invention. For example, the present invention can appropriately alter the structure of the pixels of the LCD apparatus, the amount of the sensing photo spacers of the LCD apparatus, and/or set dummy pixels in the LCD apparatus in no relation to rotate the liquid crystal molecules, and so on.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A liquid crystal display (LCD) apparatus, comprising:
a first substrate;
a plurality of display electrodes formed on the first substrate for receiving a display data;
a second substrate;
at least one sensing photo spacer protruding on a first surface of the second substrate; and
a conducting layer covering on at least a part of the first surface and the at least one sensing photo spacer;
wherein when combining the second substrate with the first substrate, the at least one sensing photo spacer is opposite to one of the display electrodes arranged at a corresponding location, and the conducting layer covered by the at least one sensing photo spacer is not electrically coupled to the display electrodes, and when pressing a second surface of the second substrate opposite to the first surface thereof, the conducting layer covered by the at least one sensing photo spacer adjacent to the pressed location contacts with the corresponding display electrodes, and
a perpendicular projection of the at least one sensing photo spacer protruding covers a portion of corresponding display electrode, and a shield metal be formed under the sensing photo spacer protruding.

2. The LCD apparatus as claimed in claim 1, wherein the conducting layer is a common electrode of the LCD apparatus.

* * * * *